(12) United States Patent
Huh et al.

(10) Patent No.: US 11,161,509 B2
(45) Date of Patent: Nov. 2, 2021

(54) METHOD FOR CONTROLLING COASTING GUIDE FUNCTION

(71) Applicants: HYUNDAI MOTOR COMPANY, Seoul (KR); KIA MOTORS CORPORATION, Seoul (KR)

(72) Inventors: Jee-Wook Huh, Gwangmyeong-si (KR); Yong-Hoon Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 77 days.

(21) Appl. No.: 16/681,511

(22) Filed: Nov. 12, 2019

(65) Prior Publication Data

US 2020/0385003 A1   Dec. 10, 2020

(30) Foreign Application Priority Data

Jun. 5, 2019   (KR) .................. 10-2019-0066621

(51) Int. Cl.
| | |
|---|---|
| *B60W 30/18* | (2012.01) |
| *B60W 40/105* | (2012.01) |
| *B60W 10/18* | (2012.01) |
| *B60W 50/14* | (2020.01) |
| *B60W 30/14* | (2006.01) |
| *B60W 40/00* | (2006.01) |

(52) U.S. Cl.
CPC ...... *B60W 30/18072* (2013.01); *B60W 10/18* (2013.01); *B60W 40/105* (2013.01); *B60W 50/14* (2013.01); *B60W 2554/80* (2020.02)

(58) Field of Classification Search
CPC .......... B60W 10/18; B60W 30/18072; B60W 2554/80; B60W 40/105; B60W 50/14
See application file for complete search history.

(56) References Cited

U.S. PATENT DOCUMENTS

| | | | |
|---|---|---|---|
| 9,605,614 B2* | 3/2017 | Miura .................... | B60W 10/06 |
| 10,121,371 B2* | 11/2018 | Sugawara ........ | G08G 1/096775 |
| 10,239,533 B2* | 3/2019 | Tudosie ................ | B60W 10/04 |
| 10,337,612 B2* | 7/2019 | Ringal ..................... | F16H 61/21 |
| 10,369,996 B2* | 8/2019 | Yamakado ........ | B60W 40/1005 |
| 2016/0244067 A1* | 8/2016 | Hunt ....................... | F01N 9/002 |
| 2017/0253242 A1* | 9/2017 | Fukada ................ | B60W 10/02 |
| 2018/0172156 A1* | 6/2018 | Ringal ............... | F16H 61/0403 |
| 2019/0193732 A1* | 6/2019 | Huh ..................... | B60W 30/143 |
| 2019/0283765 A1* | 9/2019 | Koti ....................... | B60W 30/17 |
| 2020/0023861 A1* | 1/2020 | Takahashi ........... | B60W 30/143 |
| 2020/0231180 A1* | 7/2020 | Takahashi ......... | B60W 60/0025 |
| 2020/0387167 A1* | 12/2020 | Sujan ................... | G05D 1/0289 |

* cited by examiner

*Primary Examiner* — Tinh Dang
(74) *Attorney, Agent, or Firm* — Mintz Levin Cohn Ferris Glovsky and Popeo, P.C.; Peter F. Corless

(57) ABSTRACT

A method for controlling a coasting guide function is provided. The method may include: detecting a speed limit and an average speed of a peripheral vehicle; detecting a valid speed limit when a coasting event occurs; and calculating a target speed by using a speed factor computed by using at least one of the valid speed limit, the average speed of the peripheral vehicle, or a current speed.

16 Claims, 9 Drawing Sheets

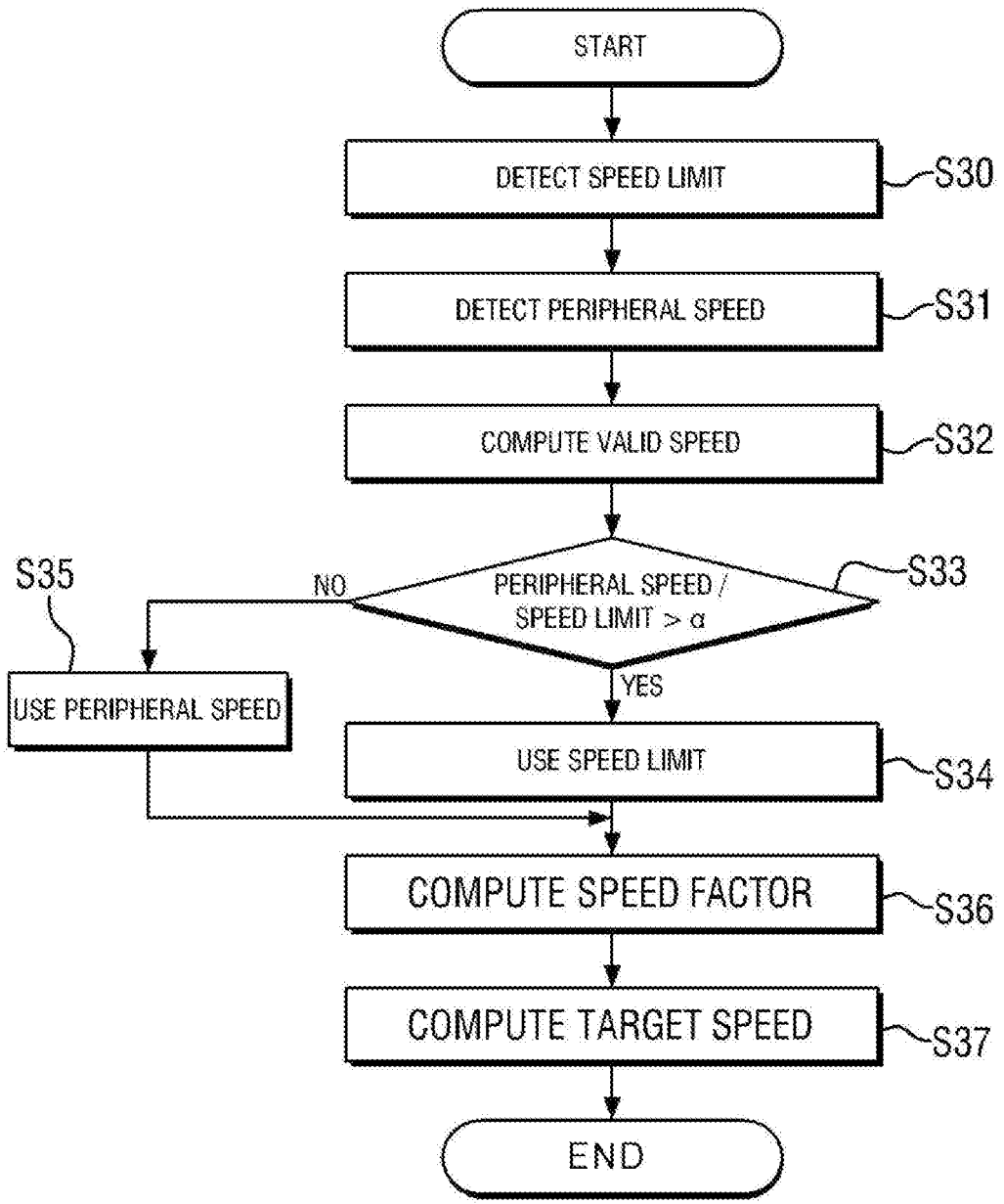

METHOD FOR CONTROLLING COASTING GUIDE FUNCTION

CROSS-REFERENCE TO RELATED APPLICATIONS

The present application claims priority to and the benefit of Korean Patent Application No. 10-2019-0066621, filed on Jun. 5, 2019, which is incorporated herein by reference in its entirety.

TECHNICAL FIELD

The present disclosure relates to a method for controlling a coasting guide function, and particularly, to a method for controlling a coasting guide to be performed by considering an average speed of a peripheral vehicle, a limiting speed for each road, and a driving speed characteristic for each driver.

BACKGROUND

The statements in this section merely provide background information related to the present disclosure and may not constitute prior art.

When there are deceleration events such as an interchange (IC), a junction (JC), an intersection, a speed limit road, a curve road, a traffic light, a U-turn, a left turn, a right turn, a toll gate, a destination, etc., in front of a road on which a vehicle travels currently and deceleration of the vehicle is required, if a driver recognizes the required deceleration in advance and maintains a state of releasing a foot from both an accelerator pedal and a brake pedal at a time when the deceleration is required, the vehicle is decelerated through inertial driving (or coasting driving). A coasting guide function is a technique for improving fuel efficiency by guiding and inducing coasting of the driver at an appropriate time when there is such a front deceleration event. Such a technique is a technique which is being actively developed particularly in eco-friendly vehicles such as a hybrid electric vehicle (HEV), a plug-in hybrid electric vehicle (PHEV), an electric vehicle (EV), etc., with a motor, which is a basis of autonomous driving in the future.

However, the coasting guide function in the related art primarily focuses on guiding a driver to determine an estimated vehicle speed and a start point of the coasting from a current vehicle position to a target position, which is a deceleration event position based on a current vehicle state and a current road condition and start the coasting at the determined start point.

That is, since the coasting guide function in the related art utilizes the target vehicle speed determined for each deceleration event as it is, control accuracy and reliability are inevitably low. That is, in the related art, a predetermined target vehicle speed is just used according to an event type as it is and a flow of the peripheral vehicle, that is, the average speed of the peripheral vehicle is not considered in determining the target vehicle speed.

In the coasting guide function in the related art, there is no control considering the speed limit according to a road type and there is also no control considering another driving speed characteristic depending on the driver.

When the average speed of the peripheral vehicle is not considered in the related art and the predetermined target vehicle speed is used according to the event type as it is, the driver feels that the coasting through the coasting guide is started earlier than the peripheral vehicle and decelerated quickly, and as a result, there is a sense of heterogeneity or the driver feels anxiety because the coasting through the coasting guide is started later than the peripheral vehicle and deceleration is not made as compared with the peripheral vehicle which is decelerated.

In the related art, if the coasting guide is performed at a constant speed regardless of the speed limit for each road type, the driver feels that a speed of a control vehicle is controlled to be relatively very slow in the case of a road type having a higher speed limit than a general road and there is a high possibility that the driver will not drive the vehicle according to the coasting guide function and the speed of the control vehicle is controlled to be higher than another peripheral vehicle in the case of a road type having a lower speed limit than the general road and the driver may step on a brake and the coasting guide function may be released.

In the related art, if the coasting guide is performed at a constant speed regardless of the driving speed characteristic for each driver, a driver who prefers a speed higher than the speed limit depending on the road or the speed of another peripheral vehicle feels that a speed of a control vehicle is controlled to be relatively very slow and there is a high possibility that the driver will not drive the vehicle according to the coasting guide function and in the case of a driver who prefers a speed lower than the speed limit depending on the road or the speed of another peripheral vehicle, the speed of the control vehicle is controlled to be higher than an intention of the driver and the driver may step on a brake and the coasting guide function may be released.

Therefore, the coasting guide function is controlled by considering the average speed of the peripheral vehicle, the speed limit depending on the road type, and different driving speed characteristics depending on the driver, and as a result, accuracy and reliability of the coasting guide function need to be enhanced and the accuracy and reliability need to be substantially utilized.

SUMMARY

The present disclosure provides a coasting guide function by controlling the coasting guide function by considering an average speed of a peripheral vehicle, different speed limits depending on a road type, and different driving speed characteristics depending on the driver and substantially utilize the coasting guide function by increasing a coasting guide function use frequency of the driver.

In one form of the present disclosure, a method for controlling a coasting guide function is provided, which includes: detecting a speed limit and an average speed of a peripheral vehicle; detecting a valid speed limit when a coasting event occurs; and calculating a target speed by using a speed factor computed by using any one of the valid speed limit and the average speed of the peripheral vehicle and a current speed.

The method may further include determining a coasting guide start point by using data acquired by making a coasting point of a driver into a database with respect to each coasting event.

The method may further include determining a coasting guide transition point by using data acquired by making a braking start point of the driver into the database with respect to each coasting event.

In the detecting of the speed limit and the average speed of the peripheral vehicle, the speed limit is detected from navigation information and speed flows of a vehicle at front, rear, and rear lateral sides are collected as data by using a radar to detect the average speed of the peripheral vehicle.

In the detecting of the valid speed limit, any one of the speed limit of a road in which the vehicle currently travels, the speed limit of the road after the coasting event, and the speed limit of a target point may be detected as the valid speed limit.

When the road in which the vehicle currently travels is a highway or an expressway, the speed limit of the road in which the vehicle currently travels may be detected as the valid speed limit.

When the road after the coasting event is the highway or the expressway, the speed limit of the road after the coasting event may be detected as the valid speed limit.

When the road in which the vehicle currently travels or the road after the coasting event is not the highway or the expressway, the speed limit of the target point may be detected as the valid speed limit.

In the calculating of the target speed, the speed factor may be computed as a ratio of the current speed to any one of the valid speed limit and the average speed of the peripheral vehicle.

When the ratio of the average speed of the peripheral vehicle to the valid speed limit is larger than a predetermined value, the valid speed limit may be used for computing the speed factor and when the ratio of the average speed of the peripheral vehicle to the valid speed limit is smaller than the predetermined value, the average speed of the peripheral vehicle may be used for computing the speed factor.

The target speed may be calculated as a value acquired by multiplying the existing target speed set with respect to each coasting event by the speed factor.

Each of a maximum value and a minimum value at the coasting guide start point may be determined by using the data acquired by making the coasting point of the driver into the database.

When the coasting point of the driver is larger than the maximum value or smaller than the minimum value, the coasting guide start point may be controlled to be positioned within a range between the maximum value and the minimum value.

Whether a driving speed of the driver is faster or slower than that of a general driver in an area between the maximum value and the minimum value at the coasting guide start point may be displayed.

Each of the maximum value and the minimum value at the coasting guide transition point may be determined by using data acquired by making a braking start point of the driver into the database.

When the braking start point of the driver is larger than the maximum value or smaller than the minimum value, the coasting guide transition point may be controlled to be positioned within the range between the maximum value and the minimum value.

An active control transition scheduled time may be displayed in the area between the maximum value and the minimum value at the coasting guide transition point.

In another form of the present disclosure, as a coasting guide function area is expanded, a fuel efficiency improvement effect of approximately 0.5% is generated.

In another form of the present disclosure, since more accurate control becomes possible through differentiated control considering an average speed of a peripheral vehicle, speed limits depending on a road type, and different driving speed characteristics depending on a driver, an environment can be created in which the driver can actively use a coasting guide function.

In another form of the present disclosure, the coasting guide function can be more safely performed according to a will of the driver and more active control is possible and construction of a smart image is possible, thereby improving merchantability.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3A is a flowchart of a method for calculating a target speed of a vehicle in one form of the present disclosure.

Figure 1:
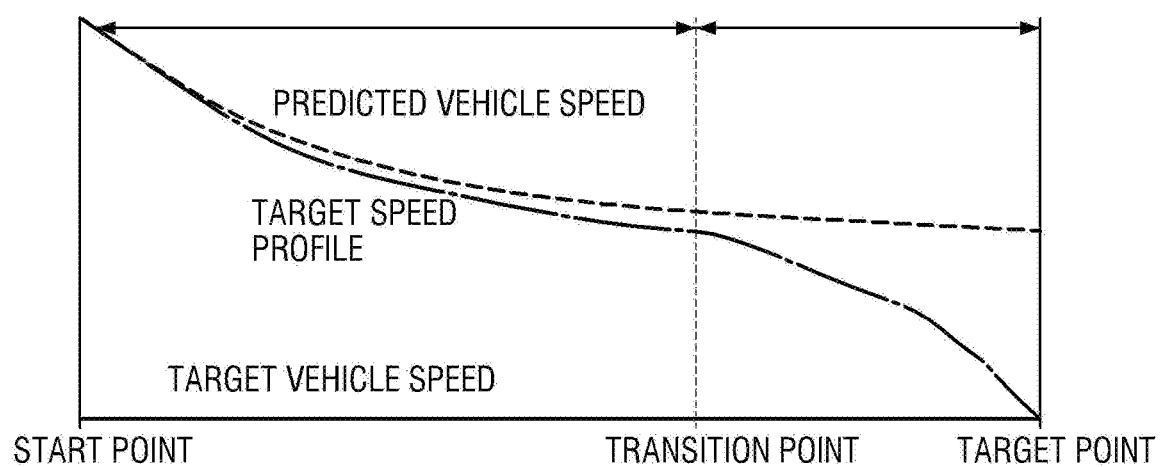
FIG. 1 is a graph showing each of a change in predicted vehicle speed, a target speed profile, and a change in target vehicle speed from a coasting guide start point up to a target point through a coasting guide transition point in the related art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to contents disclosed in the accompanying drawings. Like reference numerals presented in each drawing refer to elements that perform substantially the same functions.

Objects and effects of the present disclosure may be naturally appreciated or clearer by the following description and the objects and effects of the present disclosure are not limited only by the following description. Further, in describing some forms of the present disclosure, a detailed description of known technologies associated with some forms of the present disclosure may be omitted when it is determined that the detailed description may unnecessarily obscure the subject matter of the present disclosure.

FIG. 1 is a graph showing each of a change in predicted vehicle speed, a target speed profile, and a change in target vehicle speed from a coasting guide start point up to a target point through a coasting guide transition point in the related art.

As described above, according to the related art, when a coasting guide is performed at a constant speed regardless of an average speed of a peripheral vehicle, a speed limit for each road type, or a driving speed characteristic for each driver, a driver does not drive a vehicle according to a coasting guide function or the driver steps on a brake, and as a result, the coasting guide function may be released. In this regard, FIG. 1 shows a difference between a predicted vehicle speed which is a deceleration profile predicted only by drag torque and a target speed profile which is a deceleration target vehicle speed profile through actual coasting control at the time of turning off an APS/BPS at a coasting control start time.

Referring to FIG. 1, it can be seen that the target speed profile is gradually suddenly reduced as compared with a predicted vehicle speed from a coasting guide start point to a target point through a coasting guide transition point. There is a problem in that the coasting guide function may not be substantially utilized.

As a result, some forms of the present disclosure propose a method for controlling a coasting guide function, which may solve the problem.

First, in some forms of the present disclosure, a coasting event may mean a point where vehicle deceleration is required while the vehicle is positioned in front of the vehicle on a road where the vehicle is driven and as an example thereof, the coasting event may become a speed limit road where a speed limit is determined, an intersection, a curved road, an interchange (IC), a junction (JC), a tollgate (TG), a place where a traffic light is positioned, locations where a U-turn, a left turn, and a right turn should be performed on a driving path up to a destination set in a navigation device, a destination where the vehicle should be stopped, etc. Some forms the present disclosure are not limited thereto and all places where the target vehicle speed is determined and the vehicle deceleration is required may be included in the event.

Figure 2:
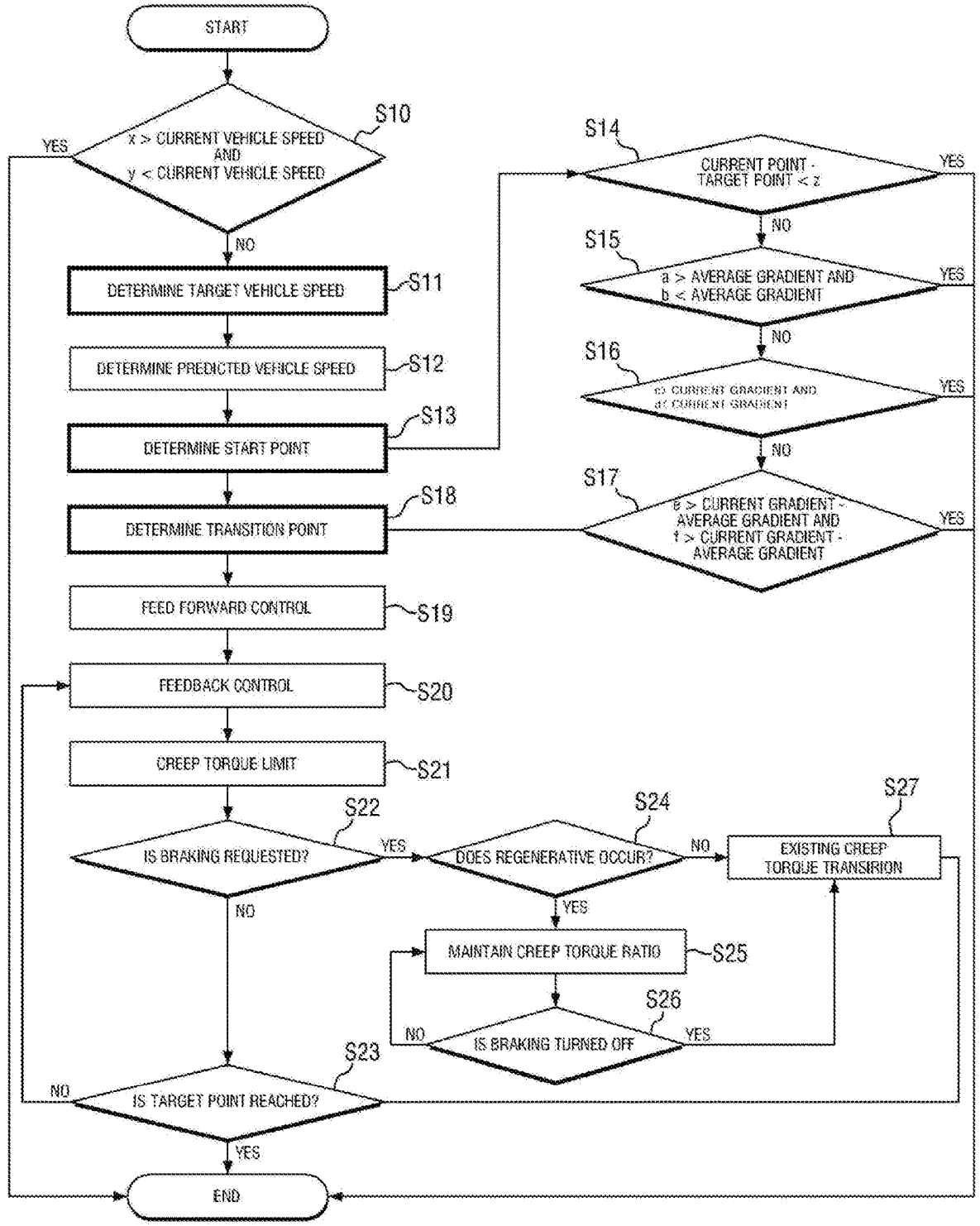
FIG. 2 is a flowchart of overall control of a coasting guide function in one form of the present disclosure.

FIG. 2 is a flowchart of overall control of a coasting guide function in some forms of the present disclosure. As shown in the flowchart of FIG. 2, the target vehicle speed is determined and then each of the coasting guide start point and the coasting guide transition point is sequentially determined and each step will be described below in detail.

In step S11, in related to determining the target vehicle speed, a reference target speed is first determined in a situation in which variable control is not performed and then, a variable control reference is set. In setting the variable control reference, as a speed profile of the driver is faster or slower than the speed limit for each road type or the average speed of the peripheral vehicle, a speed factor is computed and used for the control. The target vehicle speed is determined through the variable control using the speed factor depending on the speed profile of the driver.

Next, when the target vehicle speed is determined, which considers the speed profile of the driver depending on the speed limit for each road type or the average speed of the peripheral vehicle, a predicted vehicle speed is determined while the vehicle is decelerated to a coasting state (accelerator pedal off and brake pedal off states) at a current vehicle speed in step S12.

Thereafter, the process proceeds to step S13 and the coasting guide start point for inducing vehicle driving in the accelerator pedal off and brake pedal off states, that is, the coasting to be started is determined and the coasting guide start point is first determined in the situation in which the variable control is not performed and then the variable control reference is set. In setting the variable control reference, a coasting distance depending on a coasting habit before deceleration by the driver is computed as a factor and used for the control. The coasting guide start point is determined through variable control using a coasting factor depending on the coasting habit before the deceleration by the driver.

Next, when the coasting guide start point is determined, the coasting guide transition point is determined in step S18 and the coasting guide transition point is first determined in the situation in which the variable control is not performed and then, the variable control reference is set. In setting the variable control reference, a deceleration distance depending on a deceleration habit of the driver is computed as the factor and used for the control. The coasting guide transition point is determined through variable control using a deceleration distance factor depending on the deceleration habit of the driver.

After each of the coasting guide start point and the coasting guide transition point is determined, when the driver starts coasting driving according to a guide while the vehicle reaches the coasting guide start point, feed forward control starts by a controller (step S19). The feed forward control is maintained up to the coasting guide transition point determined above. Further, when the vehicle reaches the coasting guide transition point, the feed forward control is transited to feedback control (step S20) and the feedback control is maintained up to the target point (step S23).

In some forms of the present disclosure, when the driver releases a foot thereof from the accelerator pedal at the coasting guide start point, the feed forward control starts and coasting motor torque acquired by adding additional torque to basic creep torque is applied to a motor and in this case, since the basic creep torque and the additional torque become negative torque (motor regenerative torque), a deceleration feel of the vehicle is generated while a battery is charged by a power generation operation of the motor (steps S21 to S26).

Meanwhile, the method for controlling a coasting guide function in some forms of the present disclosure may further include a process of determining whether to enter coasting control from a road slope (gradient). In this regard, referring to FIG. 1, when an average slope (average gradient) is smaller than a first set value (a>average gradient) or the average gradient is larger than a second set value (b<average gradient) in step S15, the coasting guide function control may be prevented from entering.

The vehicle may use a current road slope of the coasting guide start point for determining whether to enter the control. That is, in step S16 of FIG. 1, when the current road slope (current gradient) at the coasting guide start point is smaller than a third set value (c>current gradient) or the current gradient is larger than a fourth set value (d<current gradient), the coasting guide function control may be prevented from entering.

When a difference between the current gradient and the average gradient at the coasting guide start point is excessively large, the corresponding interval is determined as an interval in which the reliability of the slope is low or fluctuation of the slope is very large to restrict the control entry. That is, as illustrated in FIG. 1, in step S17, when an absolute value of the difference between the current gradient and the average gradient at the coasting guide start point is larger than a fifth set value (e>current gradient−average gradient) or f<current gradient−average gradient), the coasting guide function control may be prevented from entering.

In the method for controlling a coasting guide function in some forms of the present disclosure, as illustrated in FIG. 1, in step S14, when a distance up to a current vehicle position at the time of determining the start point from the target point is smaller than a sixth set value (current point−target point<z), the entry of the coasting guide function control may be restricted.

In the method for controlling a coasting guide function in some forms of the present disclosure, as illustrated in FIG. 1, in step S10, when the current vehicle speed is less than a lower speed limit (x>current vehicle speed) or exceeds an upper speed limit (y<current vehicle speed), all control logic in subsequent steps may be terminated, and therefore, the controller does not perform the coasting guide function control.

FIG. 3A is a flowchart of a method for calculating a target speed of a vehicle in some forms of the present disclosure. Since the target speed required at a coasting event point varies depending on the driver, the target speed variable control is used in order to reflect the target speed. According to such a control scheme, the target speed is calculated from a habit in a usual event of the driver and a driving speed of a current road, and as a result, the driver may acquire an appropriate target speed. Each step of the target speed variable control is described below.

First, in steps S30 and S31, the speed limit and the average speed of the peripheral vehicle are detected, respectively. The speed limit is received and detected from navigation information and the average speed of the peripheral vehicle is detected by collecting speed flows of the vehicle at front, rear, and rear side sides as data by using a radar.

Next, the process proceeds to step S32 to detect a valid speed limit. In detecting the valid speed limit, a method for determining the target speed for each coasting event is differentiated in order for the driver to more trust the coasting guide function. That is, a speed to be used for control is detected among the speed limit of the current road, the speed limit at the target point, and the speed limit of the road after the coasting event and the detected speed is selected as the valid speed limit to be used for controlling the coasting guide function.

Figure 3B:
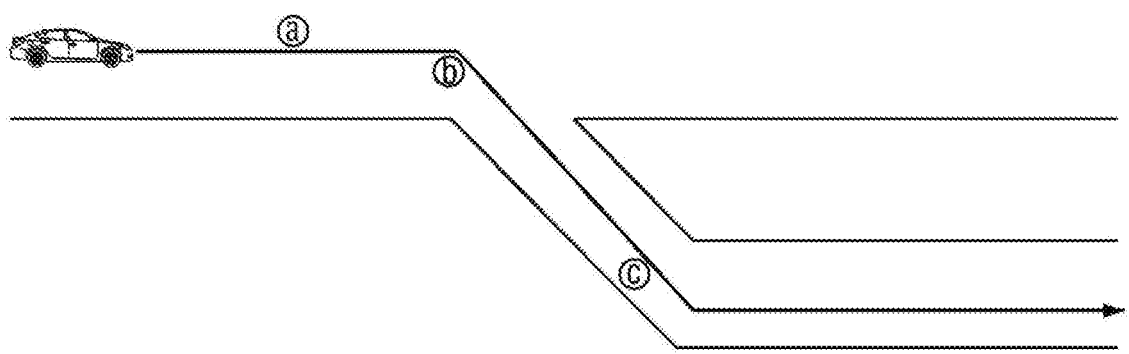
FIG. 3B is a schematic view illustrating a movement path of a vehicle when a front deceleration event occurs in one form of the present disclosure.

In this regard, FIG. 3B is a schematic view illustrating a movement path of a vehicle when a front deceleration event occurs in some forms of the present disclosure.

Referring to FIG. 3B, in some forms of the present disclosure, when the coasting event exists in front of the vehicle and when the current road is a highway or an expressway, the speed limit of the current road is prioritized and detected as the valid speed limit (in the case of ⓐ in FIG. 3B). Further, in some forms of the present disclosure, when the coasting event exists in front of the vehicle and the road is the highway or the expressway after the coasting event, the speed limit of the road after the coasting event is prioritized and detected as the valid speed limit (in the case of ⓑ in FIG. 3B). Meanwhile, when the road is a road other than ⓐ or ⓑ of FIG. 3B, the speed limit of the target point is used.

After the valid speed limit is detected as the speed limit to be used for the control as described, the process proceeds to a next step in order to compute the speed factor for the target speed variable control. First, in step S33, it is determined whether a ratio of a peripheral speed to the speed limit is larger than a predetermined value $\alpha$ according to Equation 1 below in order to determine the speed to be used for computing the speed factor.

$$\text{Peripheral speed/speed limit} > \alpha \qquad \text{Equation 1}$$

In a case where the ratio of the peripheral speed to the speed limit is larger than the predetermined value $\alpha$ as a case where vehicle communication is smooth, it is appropriate to use the speed limit, and as a result, the speed limit is used for computing the speed factor (step S34). Accordingly, the process then proceeds to step S36 and the speed factor is computed at the ratio of the current speed to the speed limit according to Equation 2 below.

$$\text{Speed factor} = \text{current speed/speed limit} \qquad \text{Equation 2}$$

Meanwhile, in the case where the ratio of the peripheral speed to the speed limit is smaller than the predetermined value $\alpha$ as a situation in which there are many vehicles or the vehicle should travel at a speed lower than the speed limit, it is appropriate to use the peripheral speed, and as a result, the peripheral speed is used for computing the speed factor (step S35). Accordingly, the process then proceeds to step S36 and the speed factor is computed at the ratio of the current speed to the peripheral speed according to Equation 3 below.

$$\text{Speed factor} = \text{current speed/peripheral speed} \qquad \text{Equation 3}$$

After the speed factor is computed according to Equation 2 or 3 above, the process proceeds to step S37 to compute the target speed according to Equation 4 below.

$$\text{Target speed} = \text{existing target speed} * \text{speed factor} \qquad \text{Equation 4}$$

According to the existing control scheme, the target speed is constantly set for each coasting event, but according to the target speed variable control scheme using the speed factor, the target speed may be set by considering the driving speed of the driver and the average speed of the peripheral vehicle.

Figure 4A:
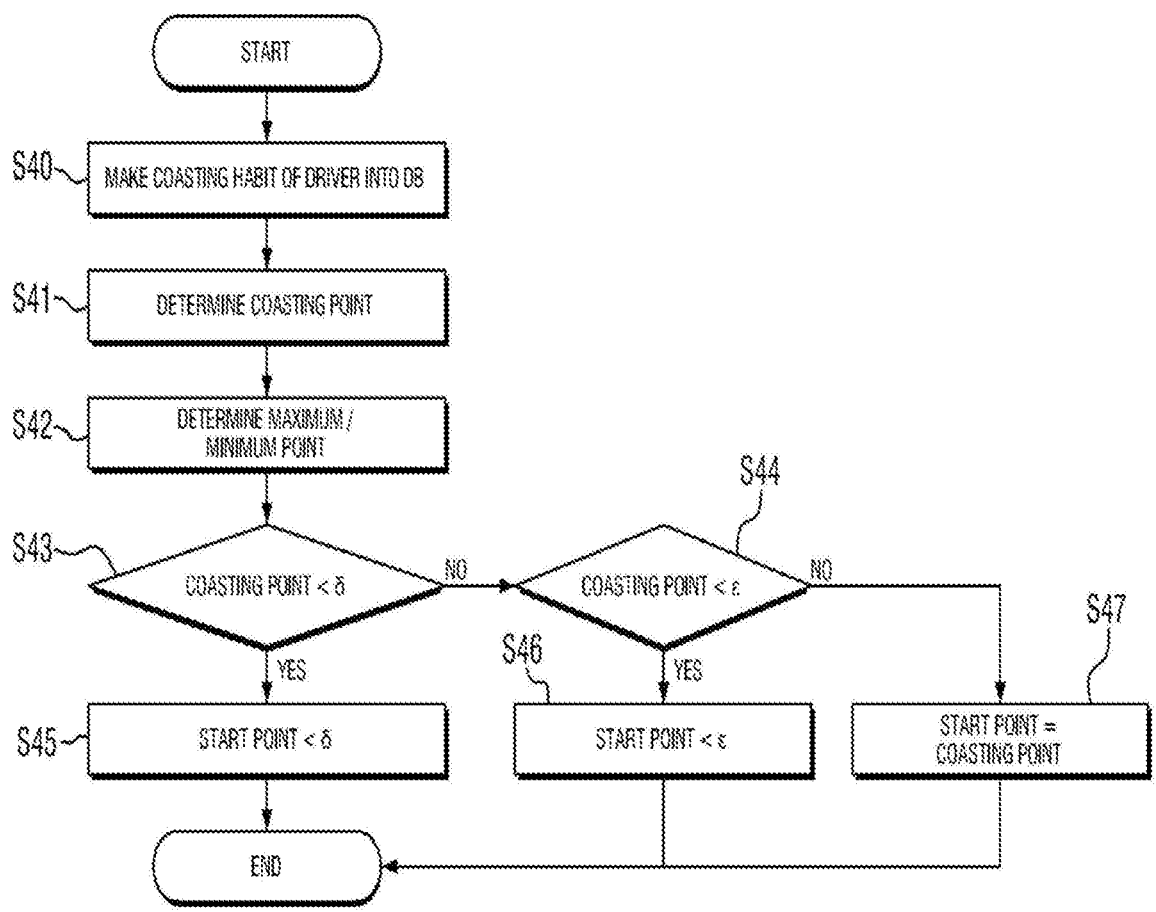
FIG. 4A is a flowchart of a method for determining a coasting guide start point in one form of the present disclosure.

FIG. 4A is a flowchart of a method for determining a coasting guide start point in some forms of the present disclosure. Since fast and slow degrees vary depending on the driving habit of the driver, etc., the variable control for the coasting guide start point is used in order to reflect the fast and slow degrees.

Referring to FIG. 4A, first, in step S40, the coasting habit of the driver is made into a database and the coasting habit of the driver in each coasting event is made into the database by considering the speed limit for each road type to reflect the driver habit to the control. As one example of the database, the database for the coasting habit of the driver in the highway is presented as Table 1 below.

TABLE 1

| Event/Speed limit | 60 kph or less | 60 TO 80 kph | 80 to 100 kph | 100 to 120 kph | 120 kph or more |
|---|---|---|---|---|---|
| IC | 300 m | 500 m | 700 m | 800 m | 800 m |
| JC | 100 m | 200 m | 300 m | 350 m | 400 m |
| TG | 200 m | 250 m | 300 m | 350 m | 400 m |

As shown in Table 1 above, the speed limit is divided into sections and the coasting point is stored for each event and then recent some data are finally stored to be made into the database. In some forms of the present disclosure, the coasting point at each coasting event may be calculated as real-time information and used without using the database.

Next, in step S41, the coasting guide start point is determined through the variable control of the coasting guide start point (i.e., coasting point) and in the existing control, the coasting guide start point is fixed to a set value, but the coasting guide start point may fluctuate according to the coasting habit of the driver in the coasting guide start point variable control.

Figure 4B:
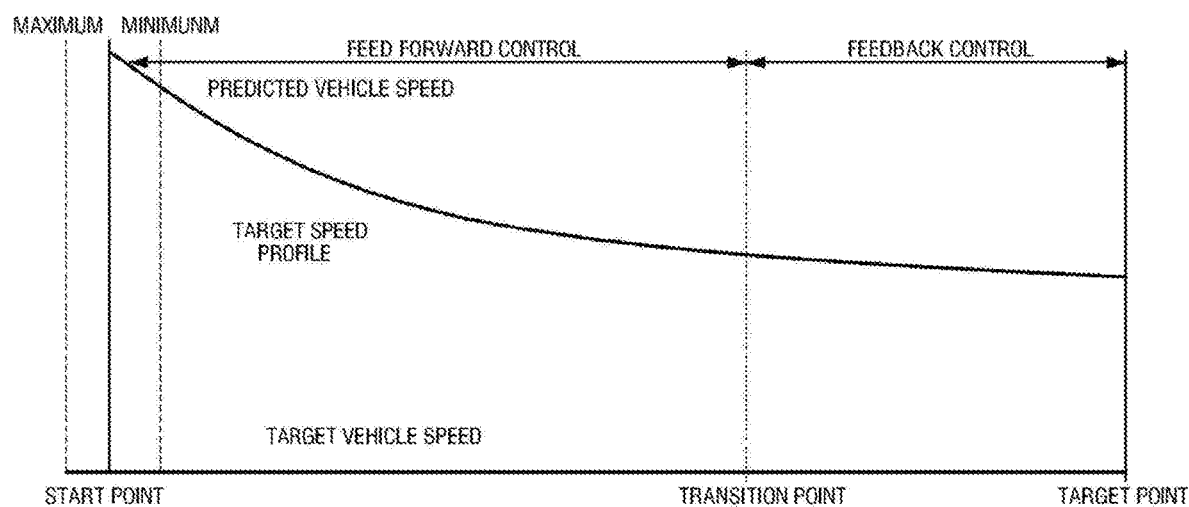
FIG. 4B is a graph showing each of a change in predicted vehicle speed, a target speed profile, and a change in target vehicle speed from a coasting guide start point up to a target point through a coasting guide transition point by reflecting coasting guide start point variable control according to the method of FIG. 4A.

In this regard, in step S42, each of maximum and minimum points of the coasting guide start point is set for each speed. The maximum and minimum points as portions represented by dotted lines before and after the start point illustrated in FIG. 4B, respectively are computed as shown in Equation 5 below.

Maximum point $\delta$=coasting distance set in existing control*$\beta$

Minimum point $\varepsilon$=coasting distance set in existing control*$\gamma$     Equation 5

In some forms of the present disclosure, the control may be performed without setting the maximum and minimum points as described above.

Next, in steps S43 and S44, whether the coasting point is larger than the maximum point $\delta$ computed according to Equation 5 above and whether the coasting point is smaller than the minimum point $\varepsilon$ computed according to Equation 5 above are determined, respectively. When the coasting point is between the maximum point $\delta$ and the minimum point $\varepsilon$ computed according to Equation 5 above, the coasting point becomes the coasting guide start point (step S47) and when the coasting point deviates from the maximum point $\delta$ or the minimum point $\varepsilon$ computed according to Equation 5 above, the coasting guide start point is positioned within the maximum and minimum points. That is, when the coasting point is larger than the maximum point (i.e., when the coasting point>$\delta$), the maximum point $\delta$ becomes the coasting guide start point (step S45) and when the coasting point is smaller than the minimum point (i.e., when the coasting point<$\varepsilon$), the minimum point $\varepsilon$ becomes the coasting guide start point (step S46).

The coasting guide start point variation makes the driver conveniently use the coasting guide function to increase the use frequency of the coasting guide function of the driver.

Figure 5A:
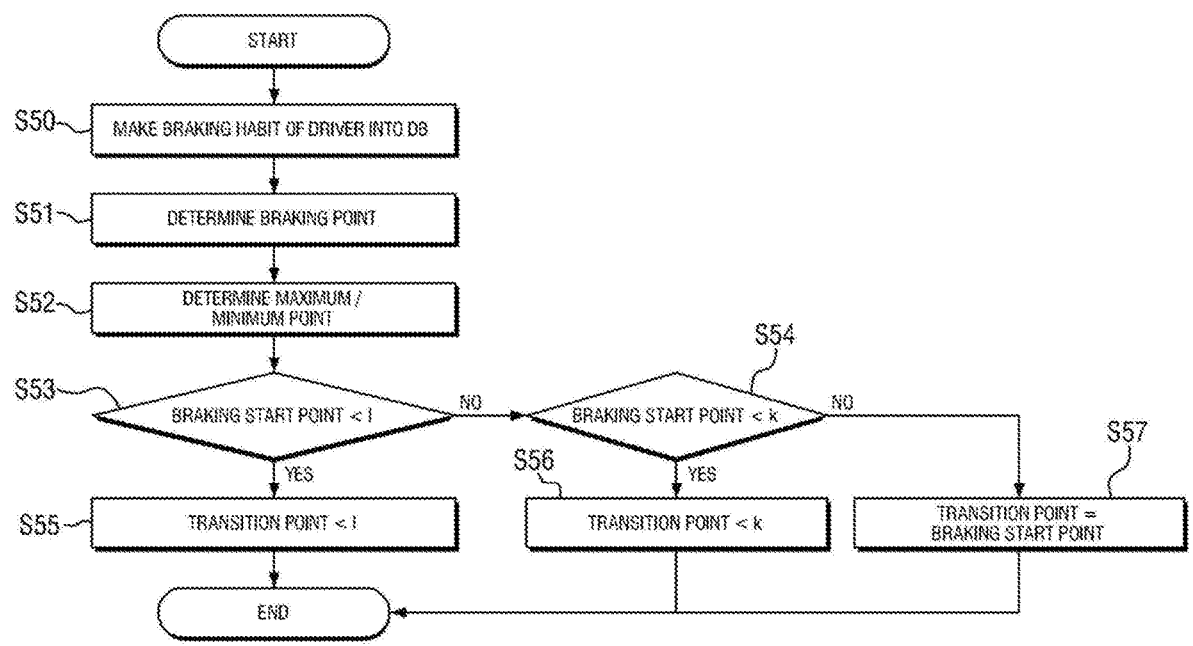
FIG. 5A is a flowchart of a method for determining a coasting guide transition point in one form of the present disclosure.

FIG. 5A is a flowchart of a method for determining a coasting guide transition point in some forms of the present disclosure. Since a preferred deceleration feel varies depending on the driver, the variable control for the coasting guide transition point is used in order to reflect the varied deceleration feel.

Referring to FIG. 5A, first, in step S50, a braking habit of the driver is made into the database and the braking habit of the driver in each coasting event is made into the database by considering the speed limit for each road type to reflect the driver habit to the control. Specifically, the limited speed is divided into the sections and a point where the braking starts for each event is stored and then recent some data are finally stored and made into the database. In some forms of the present disclosure, a braking start point at each coasting event may be calculated as the real-time information and used without using the database.

Next, in step S51, the coasting guide transition point is determined through the variable control of the coasting guide transition point (i.e., braking start point) and in the existing control, the coasting guide transition point is fixed to a set value, but the coasting guide transition point may fluctuate according to the braking habit of the driver in the coasting guide transition point variable control.

Figure 5B:
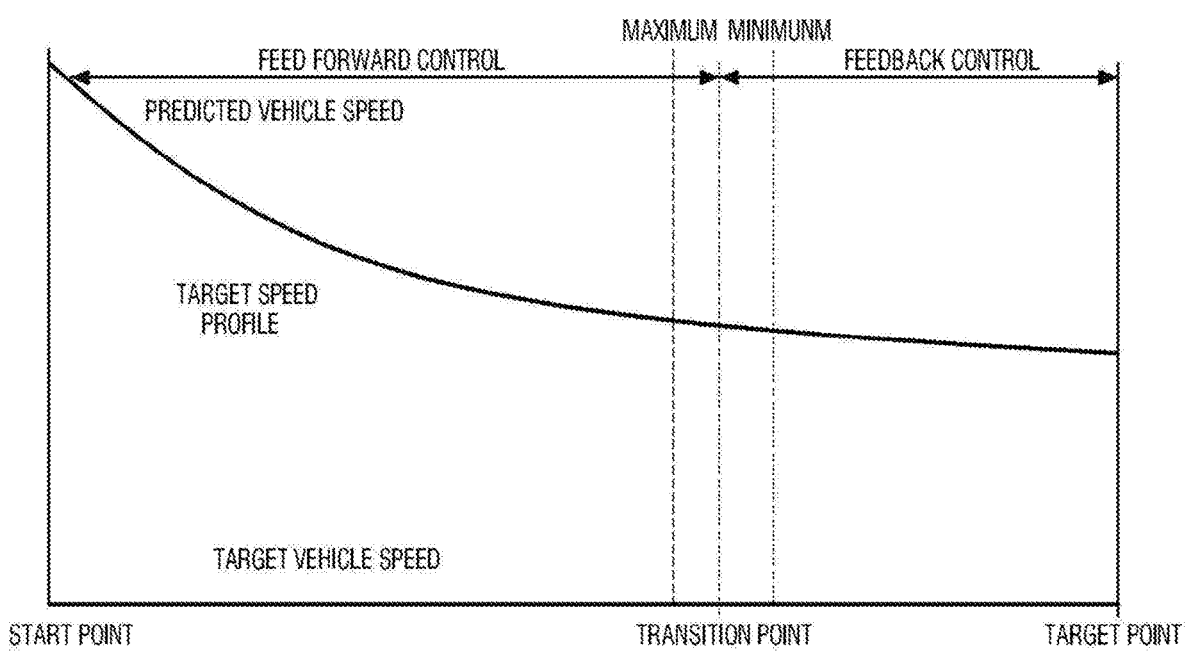
FIG. 5B is a graph showing each of a change in predicted vehicle speed, a target speed profile, and a change in target vehicle speed from a coasting guide start point up to a target point through a coasting guide transition point by reflecting coasting guide transition point variable control according to the method of FIG. 5A.

In this regard, in step S52, each of maximum and minimum points of the coasting guide transition point is set for each speed. The maximum and minimum points as portions represented by dotted lines before and after the transition point illustrated in FIG. 5B, respectively are computed as shown in Equation 6 below.

Maximum point $\iota$=coasting distance set in existing control*$\eta$

Minimum point $\kappa$=coasting distance set in existing control*$\theta$     Equation 6

In some forms of the present disclosure, the control may be performed without setting the maximum and minimum points as described above.

Next, in steps S53 and S54, whether the braking start point is larger than the maximum point $\iota$ computed according to Equation 6 above and whether the braking start point is smaller than the minimum point $\kappa$ computed according to Equation 6 above are determined, respectively. When the braking start point is between the maximum point $\iota$ and the minimum point $\kappa$ computed according to Equation 6 above, the braking start point becomes the coasting guide transition point (step S57) and when the braking start point deviates from the maximum point $\iota$ or the minimum point $\kappa$ computed according to Equation 6 above, the coasting guide transition point is positioned within the maximum and minimum points. That is, when the braking start point is larger than the maximum point (i.e., when the braking start point>$\iota$), the maximum point $\iota$ becomes the coasting guide transition point (step S55) and when the braking start point is smaller than the minimum point (i.e., when the braking start point<$\kappa$), the minimum point $\kappa$ becomes the coasting guide transition point (step S56).

The coasting guide transition point variation makes the driver conveniently use the coasting guide function to increase the use frequency of the coasting guide function of the driver.

Figure 6:
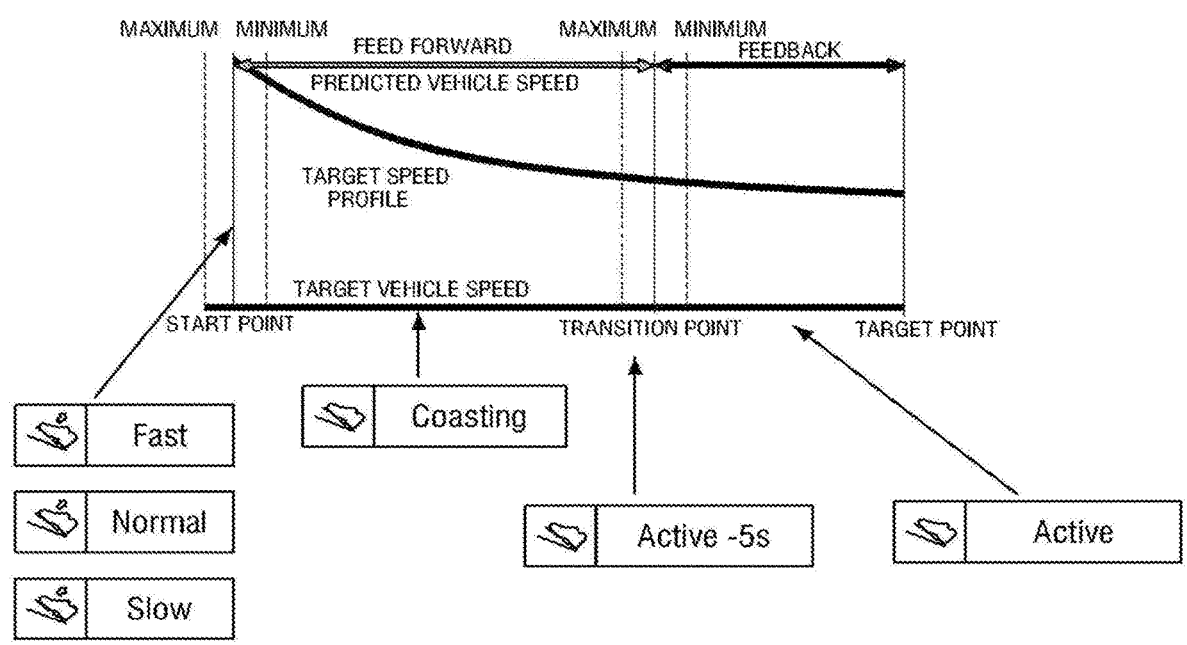
FIG. 6 is a diagram illustrating that a state in each area from a coasting guide start point up to a target point through a transition point is displayed in one form of the present disclosure.

FIG. 6 is a diagram illustrating that a state of each area from a coasting guide start point up to a target point through a transition point is displayed in some forms of the present disclosure.

In this regard, when the maximum point $\delta$ and the minimum point E of the coasting guide start point are computed according to Equation 5 above, the coasting guide start point is provided as a band. In some forms of the present disclosure, as illustrated in FIG. 6, whether the driving speed of the corresponding driver is faster or slower than that of a general driver may be displayed in the coasting guide start point band in three steps (i.e., "Fast", "Normal", "Slow"). As described, the coasting is derived through intuitive display to which the driving habit or tendency of the corresponding driver is reflected.

When the maximum point $\iota$ or the minimum point $\kappa$ of the coasting guide transition point is computed according to Equation 6 above, the coasting guide transition point is provided as the band. In some forms of the present disclosure, as illustrated in FIG. 6, an active control transition scheduled time may be displayed in a coasting guide transition point band. The active control transition scheduled time may be displayed, for example, i such a manner that the active control transition scheduled time is counted like 5, 4, 3, 2, 1.

Meanwhile, in some forms of the present disclosure, it may be displayed that the coasting is in progress until reaching a transition point band through a start point band (e.g., "coasting) and it may be displayed that the active control is in progress until reaching the target point through the transition point band (e.g., "active").

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A computer-readable storage medium having instructions stored thereon for controlling a coasting guide function of a vehicle that, when executed at a control unit of the vehicle, causes the control unit to:
    detect a speed limit and an average speed of a peripheral vehicle;
    detect a valid speed limit when a coasting event occurs;
    calculate a target speed by using a speed factor computed by using at least one of the valid speed limit, the average speed of the peripheral vehicle, or a current speed; and
    provide a coasting guide to a driver of the vehicle according to the calculated target speed.

2. The computer-readable storage medium of claim 1, further causes the control unit to:
    determine a coasting guide start point by using data acquired by making a coasting point of a driver into a database with respect to each coasting event.

3. The computer-readable storage medium of claim 1, further causes the control unit to:
    determine a coasting guide transition point by using data acquired by making a braking start point of the driver into the database with respect to each coasting event.

4. The computer-readable storage medium of claim 1 causes the control unit to:
    detect the speed limit from navigation information; and
    collect speed flows of a vehicle from a front side of the vehicle, a rear side of the vehicle, and a rear lateral side of the vehicle as data to detect the average speed of the peripheral vehicle.

5. The computer-readable storage medium of claim 1, wherein the valid speed limit comprises:
    at least one of the speed limit of a road in which the vehicle currently travels, the speed limit of the road after the coasting event, or the speed limit of a target point.

6. The computer-readable storage medium of claim 5 causes the control unit to:
    when the road in which the vehicle currently travels is a highway or an expressway, determine that the speed limit of the road in which the vehicle currently travels is the valid speed limit; and
    when the road in which the vehicle currently travels is not the highway or the expressway, determine that the speed limit of the target point is the valid speed limit.

7. The computer-readable storage medium of claim 5 causes the control unit to:
    when the road after the coasting event is the highway or the expressway, determine that the speed limit of the road after the coasting event is the valid speed limit; and
    when the road after the coasting event is not the highway or the expressway, determine that the speed limit of the target point is the valid speed limit.

8. The computer-readable storage medium of claim 1 causes the control unit to:
    use the speed factor as a ratio of the current speed to at least one of the valid speed limit or the average speed of the peripheral vehicle.

9. The computer-readable storage medium of claim 8 causes the control unit to:
    when the ratio of the average speed of the peripheral vehicle to the valid speed limit is greater than a predetermined value, use the valid speed limit to calculate the speed factor; and
    when the ratio of the average speed of the peripheral vehicle to the valid speed limit is less than the predetermined value, use the average speed of the peripheral vehicle to calculate the speed factor.

10. The computer-readable storage medium of claim 8 causes the control unit to:
    calculate the target speed as a value that is acquired by multiplying an existing target speed set with respect to each coasting event by the speed factor.

11. The computer-readable storage medium of claim 2 causes the control unit to:
    determine each of a maximum value and a minimum value at the coasting guide start point by using the data acquired by making the coasting point of the driver into the database.

12. The computer-readable storage medium of claim 11 causes the control unit to:
    when the coasting point of the driver is greater than the maximum value or less than the minimum value, control the coasting guide start point to place the coasting guide start point between the maximum value and the minimum value.

13. The computer-readable storage medium of claim 11 causes the control unit to:
    display whether a driving speed of the driver is faster or slower than a driving speed of a general driver in an area between the maximum value and the minimum value at the coasting guide start point.

14. The computer-readable storage medium of claim 3 causes the control unit to:
    determine each of the maximum value and the minimum value at the coasting guide transition point by using the data acquired by making the braking start point of the driver into the database.

15. The computer-readable storage medium of claim 14 causes the control unit to:
    when the braking start point of the driver is greater than the maximum value or less than the minimum value, control the coasting guide transition point to place the coasting guide transition point between the maximum value and the minimum value.

16. The computer-readable storage medium of claim 14 causes the control unit to:
    display an active control transition scheduled time in the area between the maximum value and the minimum value at the coasting guide transition point.

* * * * *